March 16, 1943.　　M. TURCHAN ET AL　　2,313,849
HYDRAULIC DUPLICATING LATHE ATTACHMENT
Filed Sept. 20, 1941　　7 Sheets-Sheet 2
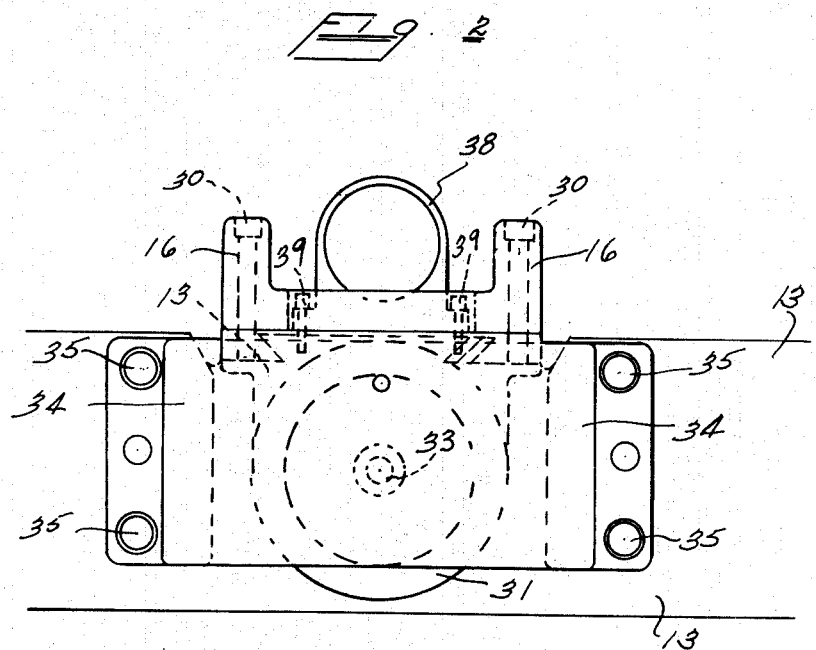
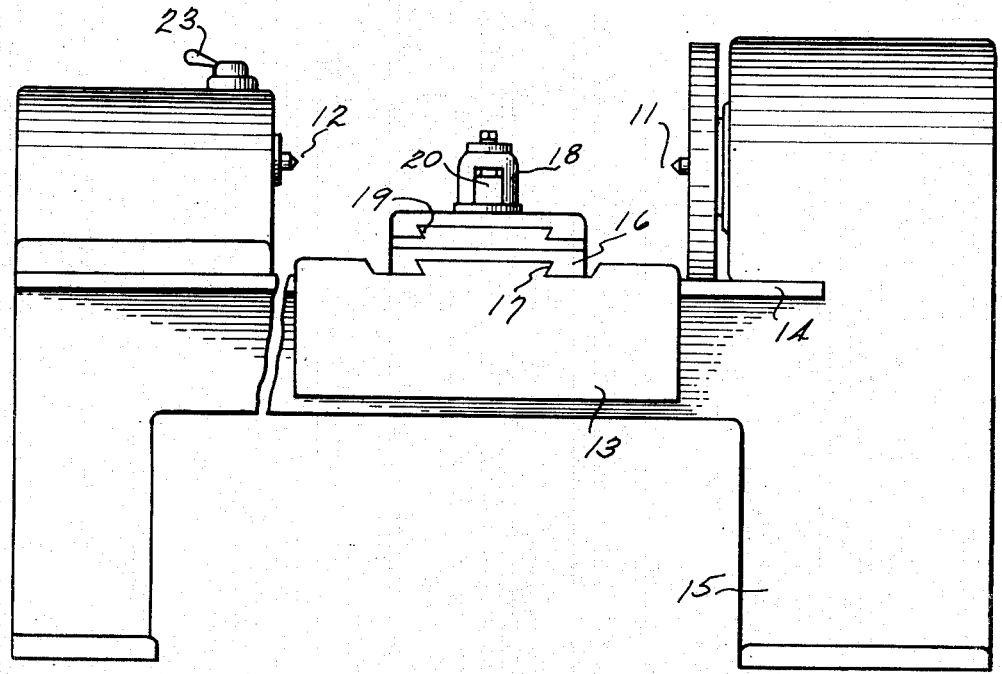
INVENTORS
Manuel Turchan and
Curtis Walker
BY Robert A. Sloman
ATTORNEY

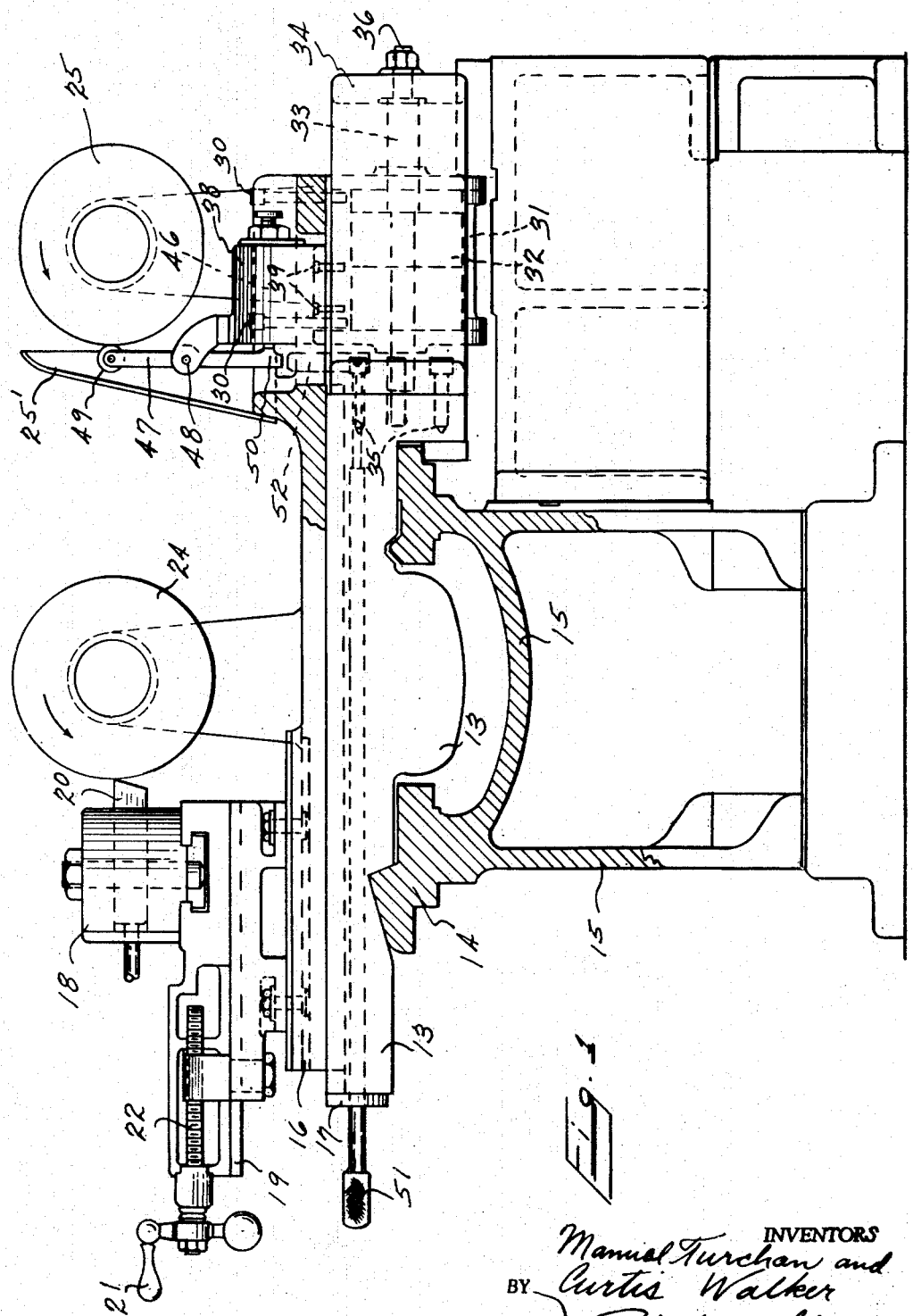

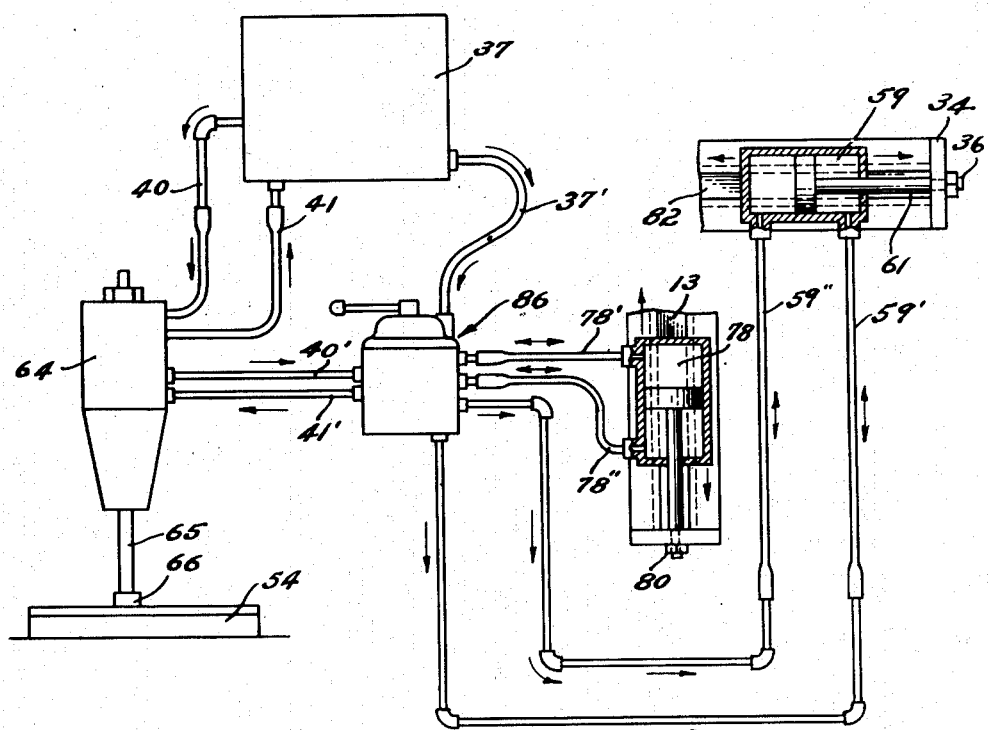

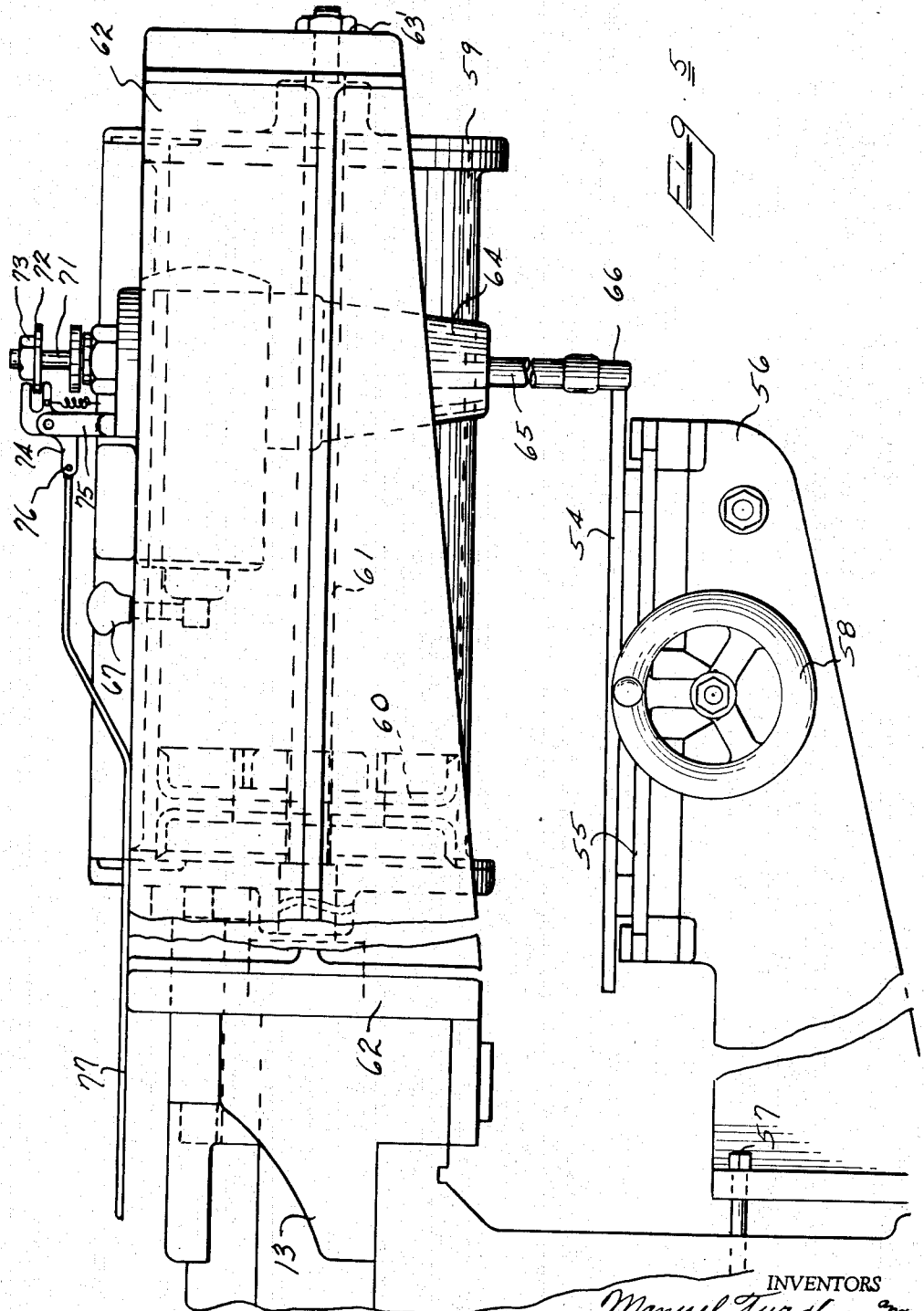

March 16, 1943. M. TURCHAN ET AL 2,313,849
HYDRAULIC DUPLICATING LATHE ATTACHMENT
Filed Sept. 20, 1941 7 Sheets-Sheet 5
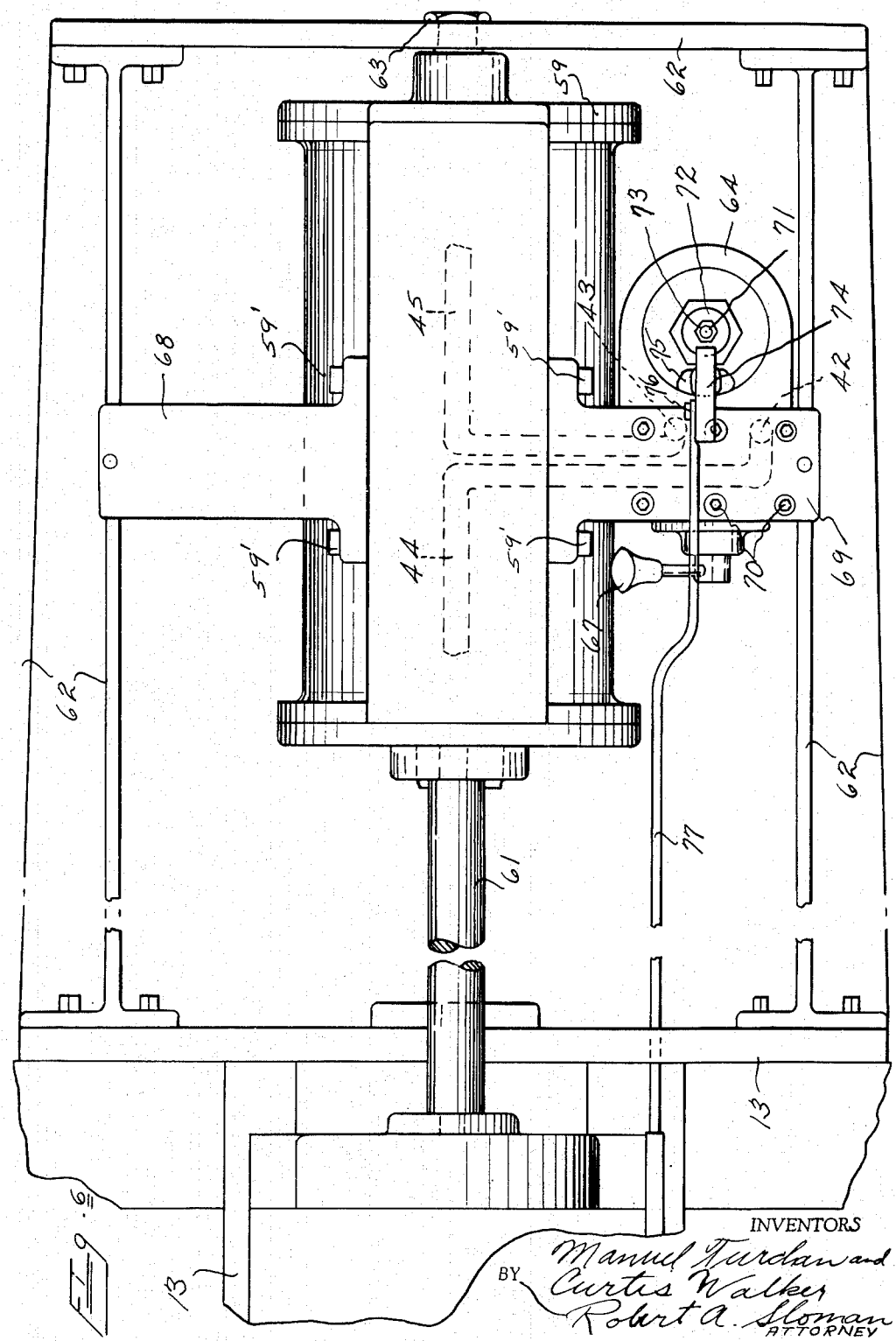
INVENTORS
Manuel Turchan and
Curtis Walker
BY
Robert A. Sloman
ATTORNEY

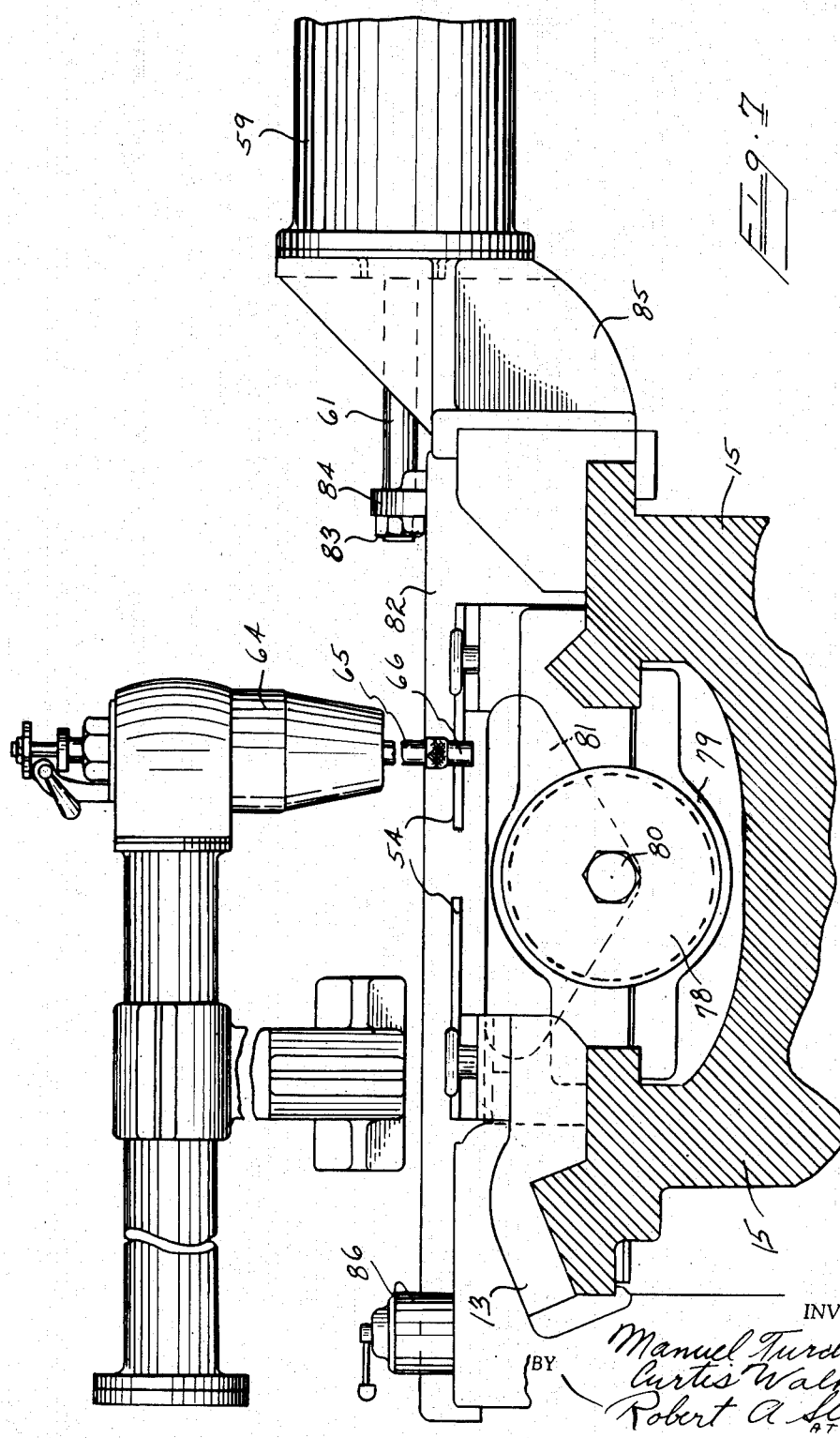

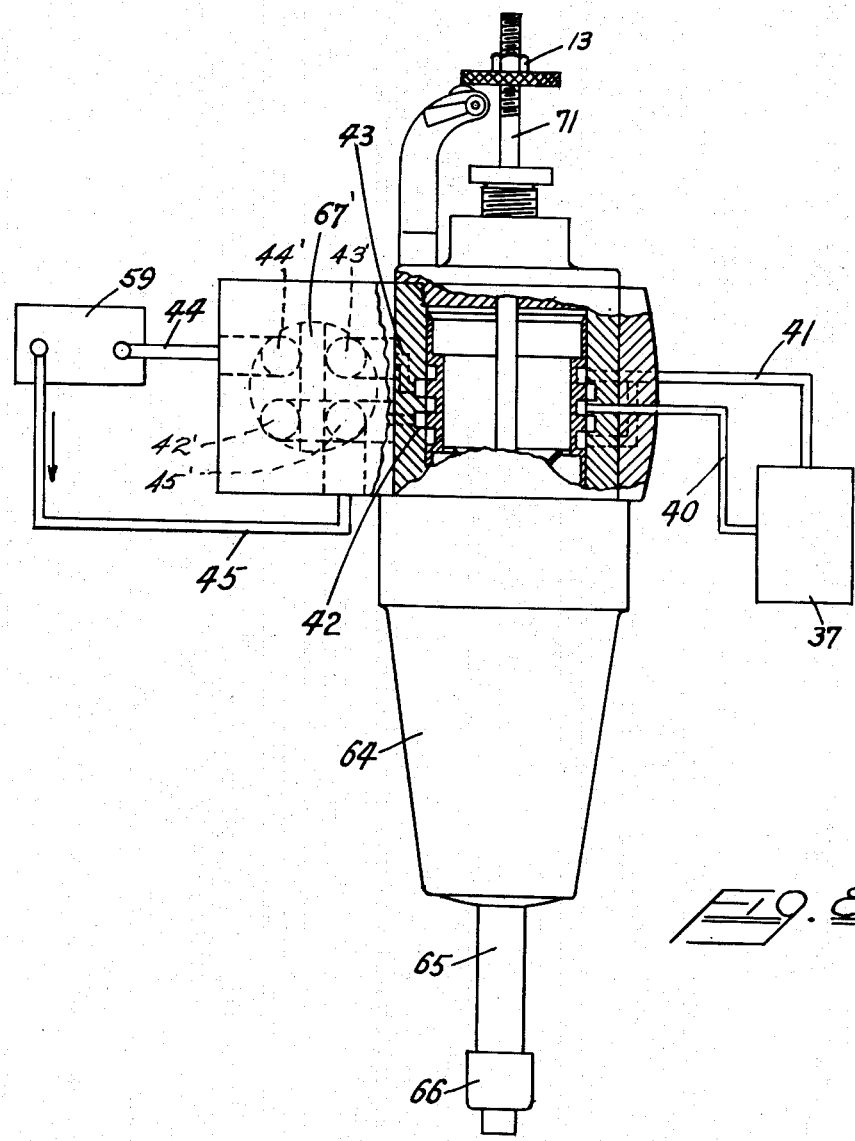

Patented Mar. 16, 1943

2,313,849

UNITED STATES PATENT OFFICE 2,313,849

HYDRAULIC DUPLICATING LATHE ATTACHMENT

Manuel Turchan, Dearborn, and Curtis Walker, Detroit, Mich.

Application September 20, 1941, Serial No. 411,714

25 Claims. (Cl. 82—14)

This invention relates to a hydraulic duplicating attachment for a lathe having a longitudinally reciprocable carriage and a cross-slide thereon carrying a lathe tool, permitting transverse adjustment of said tool with respect to a work-piece.

More particularly this invention relates to a duplicating attachment for a lathe wherein a tracer mechanism is employed for engagement with a master for regulating the transverse movement of the lathe tool carrying cross-slide, whereby on longitudinal feeding of said cross-slide supporting carriage the work-piece is reproduced from the master.

It is the object of this invention to provide a lathe tool carrying cross-slide for the longitudinally reciprocable carriage of a lathe with means for automatically governing reciprocable transverse movement of said slide with respect to a work-piece.

Another object of the invention resides in the provision on said tool carrying cross-slide of a tracer mechanism for co-operative engagement with the surface of said master, together with reciprocable means responsive to said tracer for governing reciprocal transverse movement of said cross-slide.

It is the object of this invention to provide a reciprocable cylinder for actuating said cross-slide together with hydraulic means responsive to said tracer mechanism for actuating said cylinder.

It is the further object of this invention to provide a tracer mechanism carried by said reciprocable cylinder for corresponding movement with said cross-slide.

It is the still further object of this invention to provide a cylinder reciprocated tool carrying cross-slide with a tracer mechanism carried by said cylinder and depending downwardly therefrom for co-operative engagement with the surface of a stationary templet.

It is the further object, also to provide therein a manually reversible valve within said tracer mechanism for reversing the operation thereof.

It is the further object of this invention to provide in a lathe a reciprocable cylinder for actuating the cross-slide with brackets oppositely disposed and secured to said cylinder for slidably supporting the same, together with means securing the tracer mechanism to one of said brackets for movement with said cylinder, and permitting co-operative engagement of said tracer with the surface of a stationary templet.

It is the still further object of this invention to provide tracer controlled hydraulic means for regulating longitudinal movement of the cross-slide supporting carriage.

It is the still further object of this invention to embody the principles thereof in grinding apparatus wherein it is sought to reproduce a work-piece from a templet or master.

The invention herein relates to the various arrangements of elements and their various combinations as hereinafter set out and described in connection with the appended drawings of which:

Figure 1 is a partially sectioned end elevational view of the lathe and duplicating attachment.

Figure 2 is a fragmentary elevational right end view of Figure 1.

Figure 3 is a fragmentary elevational view of the conventional lathe with carriage and cross-slide.

Figure 4 is a diagrammatic view of the hydraulic connections for Fig. 7.

Figure 5 is a fragmentary end elevational view of a tracer attachment for the lathe cross-slide showing a stationary templet.

Figure 6 is a fragmentary plan view of the same; and

Figure 7 is a partially sectioned fragmentary end elevational view of a lathe carriage and cross-slide, with hydraulic controls for both.

Figure 8 is a partially broken away sectional elevational view of the tracer showing the interior thereof.

The above drawings are to be considered merely as preferable embodiments of the invention, reference to which is made in the detailed specification hereinafter set out.

In the drawings, Figure 3 illustrates the conventional lathe with head-stock 11 and tail-stock 12. A longitudinally reciprocal carriage 13 rides upon suitable ways 14 supportable by the base member 15.

A cross-slide 16 disposed upon carriage 13, with a suitable dove-tail connection 17 carries a lathe tool support 18 for tool 20, whereby the latter may be adjusted longitudinally and transversely with respect to a rotating work-piece supported between the head-stock 11 and tail-stock 12.

The tool support or clamping means 18 is also slidably disposed upon the cross-slide 16 with a suitable dove-tail connection 19, thereby permitting manual transverse adjustment of the tool 20 by means of a suitable handle 21 and threaded shaft 22 as in Figure 1. Member 23 Figure 3 is provided for manually locking adjustment of the tail-stock 12.

Referring to Figure 1 the rotatable work-piece is indicated at 24 engaging the lathe tool 20.

The hydraulic attachment for said lathe consists of means governing reciprocal transverse feeding of the lathe tool 20 with respect to the rotating work-piece 24, as said tool is mechanically fed longitudinally thereof; i. e. this is accomplished by alternately governing the reciprocable movement of the cross-slide 16.

Cross-slide 16 is secured at its end by bolts 30 Figure 2 to the reciprocal cylinder 31. A stationary piston 32 is disposed within said cylinder secured to the stationary piston rod 33.

A suitable bracket 34 joined to the longitudinally reciprocable carriage 13 by bolts 35 provides a support for the piston rod 33 disposed therethrough and bolted at 36.

Thus the reciprocable cylinder 31 rides upon the stationary piston rod 33 and being bolted to the cross-slide 16, thereby actuates the same governing reciprocal transverse feeding thereof.

Cylinder 31 is hydraulically actuated by fluid under pressure from an external pressure source such as the hydraulic unit 37 shown diagrammatically in Fig. 4 and containing a fluid pressure pump.

By means of suitable flexible conduits, fluid under pressure is thus conducted to one side or the other of piston 32 within cylinder 31 causing movement of said cylinder in one direction or the other depending on which end of the cylinder receives the fluid.

A tracer or fluid control mechanism, interposed between said hydraulic unit and cylinder is employed for regulating such flow of fluid, automatically directing the same to one end or the other of said cylinder depending upon the movement of a valve within said tracer mechanism. Said tracer consists of a hollow cylindrical housing 38 secured to the top of cylinder 31 by bolts 39.

Fluid inlet and outlet openings are provided in said housing communicating respectively with the fluid pressure conduit 40 from the hydraulic unit 37 and the return exhaust conduit 41.

Said housing 38 also has two fluid pressure outlet openings 42 and 43 as in Figure 6 for conducting fluid under pressure to one end or the other of cylinder 59 or cylinder 31 Figure 1 through the conduits 44 and 45 respectively.

Valve 46 is reciprocally disposed within housing 38 and is provided with a plurality of annular openings adapted for alternate communication with the fluid outlets 42 and 43, and with the fluid pressure inlet conduit 40 and return conduit 41.

Consequently in certain positions of said valve fluid under pressure from conduit 40 is conducted to outlet 42 and through conduit 44 to one end of the cylinder. Fluid thereby forced out of said cylinder on the other side of piston 32 is permitted to return through conduit 45 and opening 43 whence it is conducted through the housing 38 and through the exhaust conduit 41 back to the hydraulic unit 37.

On the other hand in certain other positions of valve 46 fluid under pressure from conduit 40 is conducted to outlet 43 and through conduit 45 to the opposite end of cylinder 31. Fluid thereby forced out of said cylinder on the other side of piston 32 is permitted to return through conduit 44 and opening 42 whence it is conducted through housing 38 and through the exhaust conduit 41 back to the hydraulic unit 37.

This operation is more fully described in our copending application, Serial #307,754, now Patent No. 2,301,719, dated Nov. 11, 1942, which relates to a Hydraulic duplicating attachment for high speed heads.

Movement of valve 46, which is resiliently seated within housing 38, and its positioning within said housing is determined by the lever 47, which is centrally pivoted to the bracket 48 secured upon housing 38.

One end of said lever has rotatably journaled thereon a ball-bearing journaled roller 49 adapted to co-operatively engage the surface of the rotatable cam 25.

The opposite end 50 of lever 47 is adapted to engage the top of valve 46 forcing the same inwardly within the housing 38 or permitting said valve to move outwardly by action of its resilient mounting.

Thus it is seen that variations in the surface of the cam cause corresponding movements of the tracer valve 46 which in turn govern transverse feeding of the cylinder 31 and cross-slide 16, thereby regulating the position of the lathe tool 20 with respect to the rotating work-piece 24. Consequently the above described duplicating attachment enables the reproduction of the rotatable cam 25 in the rotating work-piece 24.

A manual control 51 (Figure 1) is reciprocably disposed through the carriage 13 within a transverse opening therein and an arm 52, secured upon the end thereof is adapted to engage the top of valve 46 for operation thereof independently of the hydraulic control above described.

It will be noted further that a conduit 53 from a vacuum producing means within the hydraulic unit 37 is joined to the housing 38 and is adapted to scavenge any leaking fluid therefrom returning the same to said hydraulic unit.

A shield 25' carried by cross-slide 16 is employed as shown in Figure 1 for protecting the templet 25 from flying chips of metal.

A slightly different embodiment of the invention is illustrated in Figures 5 and 6 wherein a stationary templet 54 is fixedly mounted upon a suitable slide 55. A slide supporting table 56 is provided, bolted at 57 to the base 15 of the lathe. By means of the handle 58 and a suitable threaded bolt templet 54 may be adjusted longitudinally on the table 56.

The cross-slide, not shown in Figures 5 and 6, is similar to the cross-slide 16 of Figure 1 with the end thereof suitably secured to the reciprocable cylinder 59. A piston 60 is rigidly supported within said cylinder upon the stationary piston rod 61. The latter is supported by the bracket 62 disposed therethrough and secured by bolt 63.

Said piston supporting bracket is suitably secured to the longitudinally reciprocable lathe carriage 13 in the manner hereinbefore described to move therewith.

Similarly fluid under pressure is supplied from a suitable hydraulic unit to one end or the other of cylinder 59 through conduits 44 or 45. Also, the flow of fluid to one side or the other of stationary piston 60 is governed by a tracer mechanism consisting of a housing 64 to which are joined a fluid pressure conduit 40, exhaust conduit 41, and a vacuum conduit 53.

Similarly a tracer valve is disposed within the tracer housing 64 resiliently seated therein for controlling the flow of fluid under pressure from conduit 40 to either outlet 42 or 43, and at the same time govering the return of exhaust fluid from either outlet 43 or 42 back to the hydraulic unit 37 through the exhaust conduit 41.

A tracer spindle 65, longitudinally disposed within the housing 64 is adapted to actuate the fluid control valve controlling its movement within the tracer housing. A tracer tip 66 on the end of spindle 65 is adapted to co-operatively engage the templet 54, where by action of the latter upon the former motion is imparted to said spindle thereby governing the direction of movement of the resiliently seated control valve within the tracer housing 64.

Thus it is seen on longitudinal movement of the lathe carriage carrying the tracer mechanism, in the manner herein before set out that the spindle 65 is intermittently actuated which operates the fluid control valve and this in turn governs the reciprocable movement of the cylinder 59 and the cross-slide 16 secured thereto, as illustrated in Figure 1.

So that similarly the rotatable work-piece 24 is hydraulically reproduced from a templet, but the templet is stationary, as contrasted with the first described embodiment Figure 1 wherein the cam 25 rotated in unison with the work-piece.

A handle 67 is connected to the tracer valve whereby the control maybe manually reversed as and when desired merely by actuating said handle. Referring to Fig. 8 the reversing mechanism is shown with a rotatable member 67' connected to said handle 67. Outlet 42 from the tracer joins outlet 42' by a suitable conduit so that fluid from the tracer may be directed to either cylinder outlet 44' or 45' depending upon the position of reverse valve member 67'. Likewise outlet 43 joins outlet 43' by a suitable conduit so that fluid from the tracer, depending upon the operation of the tracer valve, may be directed to outlet 43' for direction to either cylinder outlet 45' or 44' depending upon the position of valve member 67'.

Referring to Figure 6 two brackets 68 and 69 are oppositely disposed and bolted to the cylinder 59 at points 59'. Said cylinder reciprocable with respect to piston 60 is supported by said brackets, the outside ends of which are adapted to be slidably supported upon the piston supporting bracket 62.

The tracer housing 64 carried by bracket 69 secured thereto by bolts 70 downwardly depends therefrom whereby the tracer spindle 65 is adapted to engage the surface of the templet 54. This is different from the first described embodiment Figure 1, wherein the tracer mechanism 38 was supported directly upon the cylinder 31.

A piston rod 71 joining the control valve within the tracer extends above the housing 64 and has secured thereto a disc 72 bolted at 73. A cantilever 74 is pivoted to the bracket 75 on housing 64 and has a bifurcated end adapted to engage the disc 72. The other end of the cantilever is pivotally joined at 76 to the manual valve control rod 77, whereby it is seen that the control valve in the tracer mechanism may be manually actuated independently of the hydraulic unit for causing corresponding movements of the cross-slide actuating cylinder 59.

Figure 7 illustrates a slightly different embodiment. The operation thereof is similar to the operation of the embodiment shown in Figures 5 and 6, with the exception that a hydraulic control is provided for reciprocably actuating the longitudinally movable lathe carriage 13, which is slidably mounted upon the base member 15.

Reciprocable cylinder 78 has a clamp 79 secured thereto which is also joined to the reciprocable carriage 13.

A stationary piston, not shown, is disposed within cylinder 78 and secured upon a stationary piston rod which is bolted at 80 to the anchor plate 81.

A cross-slide 82 is provisioned upon carriage 13 for transverse adjustment of a lathe tool carried thereby as in Figure 1 but not shown in Figure 7.

A cylinder 59 is similarly provided as in Figures 5 and 6 transversely reciprocable with respect to its stationary piston and piston rod 61, which is rigidly secured by a bolt 83 to the anchor bracket 84.

Cylinder 59 is joined to cross-slide 82 by the intermediate cylinder bracket 85 movable therewith, whereby transverse feeding of said cross-slide is obtained.

Fluid under pressure is similarly provided from a hydraulic unit 37 for actuating cylinder 59 or 78 in one or the other direction.

Similarly a tracer mechanism with housing 64 is provided for governing the flow of fluid by a suitable tracer actuated valve therein, to one side or the other of the pistons within either cylinder 78 or 59.

A templet 54 is provisioned upon a suitable holder upon cross-slide 82 of the lathe, and the tracer tip 66 on the end of the tracer spindle 65 is adaptable to engage said templet upon either longitudinal or cross-feeding of the lathe tool and the templet, said tracer housing 64 being fixedly mounted upon a suitable support.

A manual control valve 86 is employed whereby constant feed may be directed to one side or the other of either cylinder such as cylinder 78, with the tracer controlling the movements of the other cylinder 59, in the manner above described in connection with Figures 5 and 6.

Such a hand valve is adapted to reverse the constant feed of either cylinder 78 or 59 and change tracer control from one cylinder to the other, as from cylinder 59 to cylinder 78.

Figure 4 illustrates the hydraulic connections for the embodiment shown in Figure 7 with tracer 64 for the cross-slide cylinder as well as for the carriage actuating cylinder 78. A tracer spindle is indicated at 65 with a tracer tip 66 adapted to engage the stationary templet 54.

A hydraulic unit 37 is indicated with a fluid pressure conduit 40 to the tracer, and a return conduit 41. The hand control valve is indicated diagrammatically at 86 with fluid supply conduit 40' and return conduit 41'.

Hand valve 86 provides an alternate fluid source to both ends of the cross-slide actuating cylinder 59 through the conduits 59' and 59''. With fluid under pressure conducted to one side thereof, fluid from the other side of cylinder 59 is conducted back to the valve 86.

Likewise valve 86 interconnects both ends of cylinder 78 through conduit 78' and conduit 78''. Said valve is so constructed with a plurality of outlet ports joining conduits 59', 59'', 78' and 78'' respectively. By operation of said valve tracer control is given through conduits 40' and 41' which are interconnected with a set of conduits to the respective cylinders 59 and 78. At the same time a constant fluid source 37' direct from the hydraulic unit 37 may be directed through the hand control valve 86 to one end or the other of the cylinder not under tracer control.

The detail of the operation of the above control valve is not herein set out, but is fully described in our copending application Serial #366,082, entitled: "Profiling and contouring tracer mechanism, hydraulic connections, and directional control."

Having described our invention reference should now be had to the following claims for determining the scope thereof:

We claim:

1. A duplicating attachment for a lathe having a reciprocable carriage, a reciprocable lathe-tool carrying cross-slide thereon, and a rotatable work-piece; comprised of a fluid reciprocated cylinder secured to said cross-slide, a stationary templet, a tracer cooperatively engaging the surface thereof, and a fluid control valve joined to said tracer mounted upon said cylinder, responsive to movements of said tracer for controling fluid under pressure to said cylinder, for governing reciprocable lathe-tool cross-feeding.

2. A duplicating attachment for a lathe having a reciprocable carriage, a reciprocable lathe-tool carrying cross-slide thereon, and a rotatable work-piece; comprised of a fluid reciprocated cylinder secured to said cross-slide, a stationary piston and piston rod within said cylinder, secured to said carriage for longitudinal movement therewith, a templet, a tracer cooperatively engaging the surface thereof, a fluid control valve joined to said tracer mounted upon said cylinder, responsive to movements of said tracer for controlling fluid under pressure to said cylinder, for governing reciprocable lathe-tool cross-feeding.

3. A duplicating attachment for a lathe having a reciprocable carriage, a reciprocable lathe-tool carrying cross-slide thereon, and a rotatable work-piece; comprised of a fluid reciprocated cylinder with a stationary piston therein; joined to said cross-slide, a piston rod, a bracket secured to said carriage, oppositely disposed means secured to said cylinder, adapted to slideably support the same upon said bracket, a stationary templet, a tracer cooperatively engaging said templet, and fluid control means responsive to movements of said tracer for directing fluid under pressure to said cylinder, for governing reciprocable lathe-tool cross-feeding.

4. A duplicating attachment for a lathe having a reciprocable carriage, a reciprocable lathe-tool carrying cross-slide thereon, and a rotatable work-piece; comprised of a fluid reciprocated cylinder with a stationary piston therein, secured to said cross-slide, means secured to said carriage for slideably supporting said cylinder, to move with said cross-slide, a templet, a valve housing mounted on said cylinder, a fluid controlling valve seated within said housing for directing fluid from a pressure source to one side or the other of said piston, a tracer joined to said valve within said housing and projecting therefrom for cooperatively engaging said templet, for actuating said valve, thereby governing reciprocable feeding of said cross-slide.

5. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, means secured to said carriage, oppositely disposed means secured to said cylinder, adapted to slidably support the same upon said means, a templet, a tracer housing secured to one of said cylinder supports and downwardly depending therefrom, a tracer spindle disposed within said housing adapted to engage said templet, fluid controlling means responsive to movements of said spindle for controlling fluid under pressure to said cylinder, for governing reciprocable lathe-tool cross-feeding.

6. A duplicating attachment for a lathe having a reciprocable carriage, a reciprocable lathe-tool carrying cross-slide thereon, and a rotatable work-piece; comprised of a fluid reciprocated cylinder secured to said cross-slide, and movable therewith a templet, a tracer cooperatively engaging the surface thereof, a fluid valve mounted upon said cylinder, joined to and responsive to movements of said tracer for controlling fluid under pressure to said cylinder, for governing reciprocable lathe-tool cross-feeding, and means on said tracer for manually reversing the operation of said fluid control valve.

7. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, a piston rod, a bracket secured to said carriage, oppositely disposed means secured to said cylinder, adapted to slidably support the same upon said bracket, a templet, a tracer cooperatively engaging said templet, fluid control means responsive to movements of said tracer for directing fluid under pressure to said cylinder, for governing reciprocable lathe-tool cross-feeding, and a manual control means joined to said fluid control means for operating the same independently of said tracer.

8. A duplicating attachment for a lathe having a reciprocable carriage, a reciprocable lathe-tool carrying cross-slide thereon, and a rotatable work-piece; comprised of a reciprocable cylinder secured to said cross-slide, a stationary piston and piston rod within said cylinder retained by said carriage, a templet, a tracer supported and carried by said cylinder, cooperatively engaging the surface of said templet, and a fluid control valve responsive to movements of said tracer for controlling fluid under pressure to one side or the other of said piston for governing lathe-tool cross-feeding.

9. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, a bracket secured to said carriage, oppositely disposed means secured to said cylinder, adapted to slidably support the same upon said bracket, a templet, a tracer cooperatively engaging said templet, a fluid control valve joined to said tracer, responsive to movements thereof for directing fluid under pressure to said cylinder, for governing reciprocable lathe-tool cross-feeding.

10. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, means secured to said carriage, oppositely disposed means secured to said cylinder, adapted to slidably support the same upon said first means, a templet, a tracer carried and supported by said cylinder cooperatively engaging said templet, and a fluid control valve joined to said tracer and responsive to movements thereof for directing fluid under pressure to said cylinder, for governing reciprocable lathe-tool cross-feeding.

11. A duplicating attachment for a lathe having a reciprocable carriage, a reciprocable lathe-tool carrying cross-slide thereon, and a rotatable work-piece; comprised of a fluid reciprocated cylinder with a piston therein, secured to said cross-slide, a piston rod, a tracer housing joined to and carried by said cylinder with the tracer axis transverse to the cylinder axis, a templet, a tracer within said housing and projecting therefrom for cooperatively engaging said templet, and a fluid control valve within said housing joined to said tracer and responsive to movements thereof for directing fluid under pressure to said cylinder, for governing reciprocable lathe-tool cross-feeding.

12. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, means secured to said carriage, oppositely disposed means secured to said cylinder, adapted to slidably support the same upon said first means, a templet, a tracer housing joined to and supported by said cylinder, a tracer within said housing and projecting therefrom for cooperatively engaging said templet, and a fluid control valve within said housing joined to said tracer and responsive to movements thereof for directing fluid under pressure to said cylinder, for governing reciprocable lathe-tool cross-feeding.

13. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, oppositely disposed means secured to said cylinder adapted to slidably support the same upon said carriage, a templet, a tracer housing secured to one of said cylinder supports and downwardly depending therefrom, a tracer spindle disposed within said housing adapted to engage said templet, fluid controlling means responsive to movements of said spindle for controlling fluid under pressure to said cylinder, for governing reciprocable lathe-tool cross-feeding.

14. A duplicating attachment for a lathe having a reciprocable carriage, a reciprocable lathe-tool carrying cross-slide thereon, and a rotatable work-piece; comprised of a fluid reciprocated cylinder with a piston therein, secured to said cross-slide, means secured to said carriage, oppositely disposed means secured to said cylinder, adapted to slidably support the same upon said first means, a templet, a tracer cooperatively engaging said templet, fluid control means responsive to movements of said tracer for directing fluid under pressure to said cylinder, for governing reciprocable lathe-tool cross-feeding, and means joined to said fluid control means for reversing the operation thereof.

15. A duplicating attachment for a lathe having a reciprocable carriage, a reciprocable lathe-tool carrying cross-slide thereon, and a rotatable work-piece; comprised of a fluid reciprocated cylinder with a stationary piston therein, joined to said cross-slide, a piston rod, means secured to said cylinder adapted to slidably support the same upon said carriage, a stationary templet, a tracer cooperatively engaging said templet, reciprocable fluid control means responsive to movements of said tracer for directing fluid under pressure to said cylinder, for governing reciprocable lathe-tool cross-feeding, and a manual control means joined to said fluid control means for reciprocating the same independently of said tracer.

16. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, means secured to said carriage, oppositely disposed means secured to said cylinder, adapted to slidably support the same upon said first means, a templet, a tracer cooperatively engaging said templet, fluid control means responsive to movements of said tracer for directing fluid under pressure to said cylinder, for governing reciprocable lathe-tool cross-feeding, reciprocable means joined to said carriage also responsive to movements of said tracer, and a manual control valve for selectively providing tracer control to either said cross-slide actuating cylinder or to said reciprocable carriage actuating means, and at the same time providing constant feeding in one of the two directions to the other thereof.

17. A duplicating attachment for a lathe having a reciprocable carriage, a reciprocable lathe-tool carrying cross-slide thereon, and a rotatable work-piece; comprised of a fluid reciprocated cylinder with a piston therein, joined to said cross-slide, a templet, a tracer cooperatively engaging said templet, fluid control means responsive to movements of said tracer for directing fluid under pressure to said cylinder, for governing reciprocable lathe-tool cross-feeding, reciprocable means joined to said carriage also responsive to movements of said tracer, and a manual control valve for selectively providing tracer control to either said cross-slide actuating cylinder or to said reciprocable carriage actuating means, and at the same time providing constant feeding in one of two directions to the other thereof.

18. A duplicating attachment for a lathe having a reciprocable carriage, a reciprocable lathe-tool carrying cross-slide thereon, and a rotatable work-piece; comprised of a relatively reciprocable cylinder and piston therein adapted to cause reciprocable movement of said cross-slide, a templet, a tracer operatively engaging said templet, fluid control means responsive to movements of said tracer for directing fluid under pressure to said cylinder, for governing reciprocable lathe-tool cross-feeding, a relatively reciprocable cylinder and piston therein adapted to cause reciprocable movement of said carriage, also responsive to movements of said tracer, and a manual control valve for selectively providing tracer control to either said cross-slide or to said carriage, and at the same time providing constant feeding in one of two directions to the other thereof.

19. A duplicating attachment for a lathe having a reciprocable carriage, a reciprocable lathe-tool carrying cross-slide thereon, and a rotatable work-piece; comprised of the combination with a hydraulic unit providing fluid pressure sources, of a relatively reciprocable cylinder and piston therein adapted to cause reciprocable movement of said cross-slide, a templet, a tracer operatively engaging said templet, fluid control means responsive to movements of said tracer for directing fluid under pressure to said cylinder, for governing reciprocable lathe-tool cross-feeding, a relatively reciprocable cylinder and piston therein adapted to cause reciprocable movement of said carriage, also responsive to movements of said tracer, and a manual control valve for selectively providing tracer control to either said cross-slide or to said carriage, and at the same time providing constant feeding in one of two directions to the other thereof.

20. A duplicating attachment for a lathe having a reciprocable carriage, a reciprocable lathe-tool carrying cross-slide thereon, and a rotatable work-piece; comprised of the combination with a hydraulic unit providing fluid pressure sources, of a relatively reciprocable cylinder and piston therein adapted to cause reciprocable movement of said cross-slide upon the application of fluid to either end thereof, a templet, a tracer operatively engaging the surface thereof, fluid control means responsive to movements of said tracer for directing fluid from said source to either end of said cross-slide controlling cylinder, a relatively reciprocable cylinder and piston therein adapted to cause reciprocable movement of said carriage upon the application of fluid to either end thereof, also responsive to movements of said tracer and said fluid control means, and a manual control valve having fluid connection with said hydraulic unit and said tracer, adapted for selectively providing tracer control through said cylinders to either said cross-slide or said carriage, and at the same time provide constant feeding in one of two directions to the other thereof.

21. A duplicating attachment for a lathe having a reciprocable carriage, a reciprocable lathe-tool carrying cross-slide thereon, and a rotatable work-piece; comprised of a relatively reciprocable cylinder and piston therein adapted to cause reciprocable movement of said cross-slide, a templet, a tracer operatively engaging said templet, fluid control means responsive to movements of said tracer for directing fluid under pressure to said cylinder, for governing reciprocable lathe-tool cross-feeding, a relatively reciprocable cylinder and piston therein adapted to cause reciprocable movement of said carriage, also responsive to movements of said tracer, and a manual control valve for selectively providing tracer control to either said cross-slide or to said carriage, at the same time providing constant feeding in one of two directions to the other thereof, and a manual control means joined to said fluid control means for operating the same independently of said tracer.

22. A duplicating attachment for a lathe having a reciprocable carriage, a reciprocable lathe-tool carrying cross-slide thereon, and a rotatable work-piece; comprised of reciprocable means joined to said cross-slide, a templet, a tracer operatively engaging the surface thereof, fluid control means responsive to movements of said tracer for controlling fluid under pressure to said reciprocable means for governing lathe-tool cross-feeding, reciprocable means joined to said carriage, and connected with said fluid control means, also responsive to movements of said tracer, and a manual control valve for selectively providing tracer control to either end of either of said reciprocable means, and at the same time providing constant feeding to either end of the other thereof.

23. A duplicating attachment for a lathe having a reciprocable carriage, a reciprocable lathe-tool carrying cross-slide thereon, and a rotatable work-piece; comprised of a reciprocable cylinder joined to said cross-slide, a templet, a tracer operatively engaging the surface thereof, fluid control means responsive to movements of said tracer for controlling fluid under pressure to said cylinder for governing lathe-tool cross-feeding, a reciprocable cylinder joined to said carriage and connected with said fluid control means, also responsive to movements of said tracer, and a manual control valve for selectively providing tracer control to either end of either of said cylinders, and at the same time providing constant feeding to either end of the other thereof.

24. A duplicating attachment for a lathe having a reciprocable carriage, a reciprocable lathe-tool carrying cross-slide thereon, and a rotatable work-piece; comprised of a fluid reciprocated cylinder secured to said cross-slide, a templet, a tracer operatively engaging the surface thereof, a fluid control valve joined to said tracer and responsive to movement thereof for controlling fluid under pressure to said cylinder, a fluid reciprocated cylinder secured to said carriage, also connected to said valve, and a manual control valve for selectively providing tracer control to either end of either of said cylinders, and at the same time providing constant feeding to either end of the other thereof.

25. A duplicating attachment for a lathe having a reciprocable carriage, a reciprocable lathe-tool carrying cross-slide thereon, and a rotatable work-piece; comprised of a fluid reciprocated cylinder secured to said cross-slide, a templet mounted upon said cross-slide, a tracer operatively engaging the surface of said templet, a valve housing, a fluid controlling valve seated within said housing, joined to said tracer and responsive to movements thereof for controlling fluid under pressure to said cylinder, a fluid reciprocated cylinder secured to said carriage also connected to said valve, and a manual control valve for selectively providing tracer control to either end of either of said cylinders, and at the same time providing constant feeding to either end of the other thereof.

MANUEL TURCHAN.
CURTIS WALKER.